United States Patent
Manthina (10) Patent No.: US 10,852,908 B2
(45) Date of Patent: Dec. 1, 2020

(54) METHOD AND SYSTEM FOR CONTROLLING A DISPLAY SCREEN BASED UPON A PREDICTION OF COMPLIANCE OF A SERVICE REQUEST WITH A SERVICE LEVEL AGREEMENT (SLA)

(71) Applicant: ORACLE INTERNATIONAL CORPORATION, Redwood Shores, CA (US)

(72) Inventor: Ashok Manthina, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 356 days.

(21) Appl. No.: 15/795,379

(22) Filed: Oct. 27, 2017

(65) Prior Publication Data

US 2019/0129599 A1    May 2, 2019

(51) Int. Cl.
*G06F 3/0481* (2013.01)
*G06N 7/00* (2006.01)
*G06F 3/0484* (2013.01)

(52) U.S. Cl.
CPC ......... *G06F 3/04817* (2013.01); *G06N 7/005* (2013.01); *G06F 3/04842* (2013.01)

(58) Field of Classification Search
CPC . G06F 3/04817; G06F 3/04842; G06Q 10/20; G06Q 30/016; G06Q 10/10; H04L 41/5009
See application file for complete search history.

(56) References Cited

U.S. PATENT DOCUMENTS

| | | | | |
|---|---|---|---|---|
| 7,024,580 | B2 * | 4/2006 | Guimbellot | H04L 1/22 714/1 |
| 7,529,979 | B2 * | 5/2009 | Dombrowa | G06F 11/0751 709/224 |
| 7,962,472 | B2 * | 6/2011 | Erickson | G06F 11/0709 707/713 |
| 8,620,839 | B2 * | 12/2013 | Bhatnagar | G06N 7/005 706/12 |
| 9,760,405 | B2 | 9/2017 | Antani et al. | |
| 2002/0198995 | A1 * | 12/2002 | Liu | H04L 29/06 709/226 |
| 2005/0172027 | A1 * | 8/2005 | Castellanos | H04L 41/5003 709/229 |
| 2006/0064481 | A1 * | 3/2006 | Baron | H04L 41/0886 709/224 |

(Continued)

*Primary Examiner* — Albert M Phillips, III
*Assistant Examiner* — Courtney Harmon
(74) *Attorney, Agent, or Firm* — Kraguljac Law Group, LLC (57) ABSTRACT

Systems, methods, and other embodiments associated with controlling a display screen with graphical objects in a computing system are described. In one embodiment, a method includes receiving a service request, identifying attributes of the service request, and using the attributes to retrieve from a probability data structure data records. Service criteria for processing the service request are identified, and a probability that the service request will transition to a target state in compliance with the service criteria is calculated based upon the retrieved probabilities. A display screen is controlled based upon a prediction of whether that the service request will transition to a target state in compliance with the service criteria.

14 Claims, 9 Drawing Sheets

(56) References Cited

U.S. PATENT DOCUMENTS

| | | | |
|---|---|---|---|
| 2007/0083650 A1* | 4/2007 | Collomb | G06Q 10/04 709/224 |
| 2007/0094061 A1* | 4/2007 | Hu | G06Q 10/06 705/7.13 |
| 2007/0106798 A1* | 5/2007 | Masumitsu | G06F 9/5027 709/226 |
| 2007/0265811 A1* | 11/2007 | Chalasani | G06Q 10/04 703/2 |
| 2008/0215742 A1* | 9/2008 | Goldszmidt | G06F 9/505 709/229 |
| 2009/0018812 A1* | 1/2009 | Kothari | G06Q 10/04 703/22 |
| 2009/0112531 A1* | 4/2009 | Sato | G06Q 10/06 703/2 |
| 2011/0320228 A1* | 12/2011 | Kowalski | G06Q 10/06393 705/7.11 |
| 2013/0013359 A1* | 1/2013 | Kohler | G06Q 10/06311 705/7.13 |
| 2014/0324409 A1* | 10/2014 | Ben Simhon | G06F 11/3447 703/22 |
| 2015/0039764 A1* | 2/2015 | Beloglazov | H04L 47/70 709/226 |
| 2015/0346918 A1* | 12/2015 | Bodda | G06Q 10/06313 715/825 |
| 2015/0347906 A1* | 12/2015 | Bodda | G06Q 10/20 706/52 |
| 2016/0344599 A1* | 11/2016 | Porter | H04L 47/283 |
| 2017/0287180 A1 | 10/2017 | Mitra et al. | |
| 2017/0288982 A1 | 10/2017 | Katsaros et al. | |
| 2018/0082213 A1* | 3/2018 | McCord | G06N 20/00 |
| 2018/0114120 A1* | 4/2018 | Bostick | G06F 11/079 |

* cited by examiner

PROBABILITY DATA STRUCTURE — 130

| PRODUCT (305) | TEAM (310) | TIME FRAME (315) | PROBABILITY SET (320) |
|---|---|---|---|
| EXCESS STORAGE | TEAM 1 | PAST YEAR | PROBABILITY SET (1) |
| STREAMING VIDEO | TEAM 1 | PAST YEAR | PROBABILITY SET (2) |
| CREDIT CARD PROCESSING | TEAM 3 | PAST YEAR | PROBABILITY SET (3) |
| EXCESS STORAGE | TEAM 2 | PAST YEAR | PROBABILITY SET (4) |
| STREAMING VIDEO | TEAM 2 | PAST YEAR | PROBABILITY SET (5) |

PROBABILITY DATA STRUCTURE — 130

PROBABILITY SET (1) — 325

| From (Col) To(Row) | Open | WIP | Blocked | Resolved | Reopen | Closed |
|---|---|---|---|---|---|---|
| Open | 0.4 | 0.4 | 0.01 | 0.09 | 0 | 0.1 |
| WIP | 0 | 0.4 | 0.1 | 0.4 | 0 | 0.1 |
| Blocked | 0 | 0.6 | 0.3 | 0 | 0 | 0.1 |
| Resolved | 0 | 0 | 0 | 0.6 | 0.05 | 0.35 |
| Reopen | 0 | 0.6 | 0 | 0.3 | 0.05 | 0.05 |
| Closed | 0 | 0 | 0 | 0 | 0 | 1 |

METHOD AND SYSTEM FOR CONTROLLING A DISPLAY SCREEN BASED UPON A PREDICTION OF COMPLIANCE OF A SERVICE REQUEST WITH A SERVICE LEVEL AGREEMENT (SLA)

BACKGROUND

Computing devices are used to implement various graphical services and products. A computing device may provide a graphical user interface (GUI) with which a user may interact. The GUI may display various graphical objects. Such graphical objects may provide information about an online service being performed by the computing device. The online service may be responsible for processing a service request. The service request may be expected to go through a life cycle, which may involve transitioning through one or more states. At each state, the service request may be processed/handled by one or more service devices or one or more customer devices. To facilitate the ability of the online service and a customer to manage the service request, the current state of the service request may be tracked and provided for presentation via the GUI. Accordingly, the online service is able to determine whether the service request is being processed in accordance with internal guidelines or goals, and the customer is able to determine whether the service request has progressed sufficiently in accordance with customer preferences.

In addition to internal guidelines/goals of the online service and preferences of the customer, the processing of the service request may also be governed by a Service Level Agreement (SLA). The SLA may include requirements that the online service has committed to comply with while handling the service request for the customer.

A user may interact with the graphical objects to perform operations upon service requests. For example, the graphical objects may be used to add new service requests, to remove existing service requests, to process existing service requests, or to modify existing service requests, and new graphical objects may be created and displayed to represent the changes.

In order to improve the use of the GUI, the processing of service requests through their respective life cycles, minimize lost profits due to failure to comply with SLAs, and optimize the use of resources including the service devices, network bandwidth, processing and storage sources, and/or overall system load across the computers of the online service when processing service requests, it is desirable to graphically represent service requests and allocate resources to service requests in a manner that increases compliance with SLAs.

Unfortunately, typical existing GUIs for online services are limited to determining and displaying, after the fact, whether an object was processed in accordance with its corresponding SLA. Thus, online services and customers alike are limited in their benefit from the SLA.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for controlling a display screen with graphical objects in a computing system based upon a prediction of whether a service request (or other business object, activity, etc.) will comply with service criteria, such as one or more requirements of a Service Level Agreement (SLA). In one embodiment, the service request is generated by an online service in response to a request for action from a customer. The request may be received in association with a service, such as web hosting, provided to the customer by the online service. Alternatively, the request may be received in association with a (physical) product, such as a consumer device, provided/sold to the customer by an affiliate of the online service.

The service request may progress through various states of a life cycle, such as new, work in progress, waiting for customer, resolved, and closed. The service request may be graphically presented (for processing) amongst a plurality of pending service requests. The online service may have a variety of resources that may be used to handle the pending service requests. The resources may have various capabilities/characteristics. Accordingly, each of the resources may be appropriate for various types of service requests and/or may be associated with various levels of effectiveness/speed. When the online service attempts to select (for processing) the service request from amongst the plurality of service requests, the service request may be visually indistinguishable from other service requests that are likely to comply with the requirements of their corresponding SLA. Similarly, when the online service attempts to select a resource to assign to an service request, the online service may rely upon systems that assign a uniform/defined set of resources to service requests using a queue, and without distinguishing between service requests that are likely to comply with the requirements of their corresponding SLA and those that are likely to fail to comply with the requirements of their corresponding SLA. Thus, the online service may be required to search and navigate through various menus and displays to find relevant information about the pertinent service requests. Unfortunately, the conventional means for searching and navigating are slow and significantly time consuming, thereby exacerbating the very problem of processing service requests too late.

Such systems may use a substantial amount of processing power, networking bandwidth and memory to ineffectively allocate resources and process service requests in a manner/order that does not maximize the number of SLAs that are complied with, and that thus does not maximize benefit (profit) to the online service. Thus, in order to optimize the processing of service requests by the online service, historical records of previous service requests may need to be analyzed to predict the probability of each service request complying with its corresponding SLA, and control a display screen to visually distinguish graphical representations of service requests based upon their corresponding predictions and modifying the allocation of resources as needed. The controlling of the display screen increases the speed at which the relevant service requests are identified, and thus improves the speed and usability of computer displays.

Figure 1:
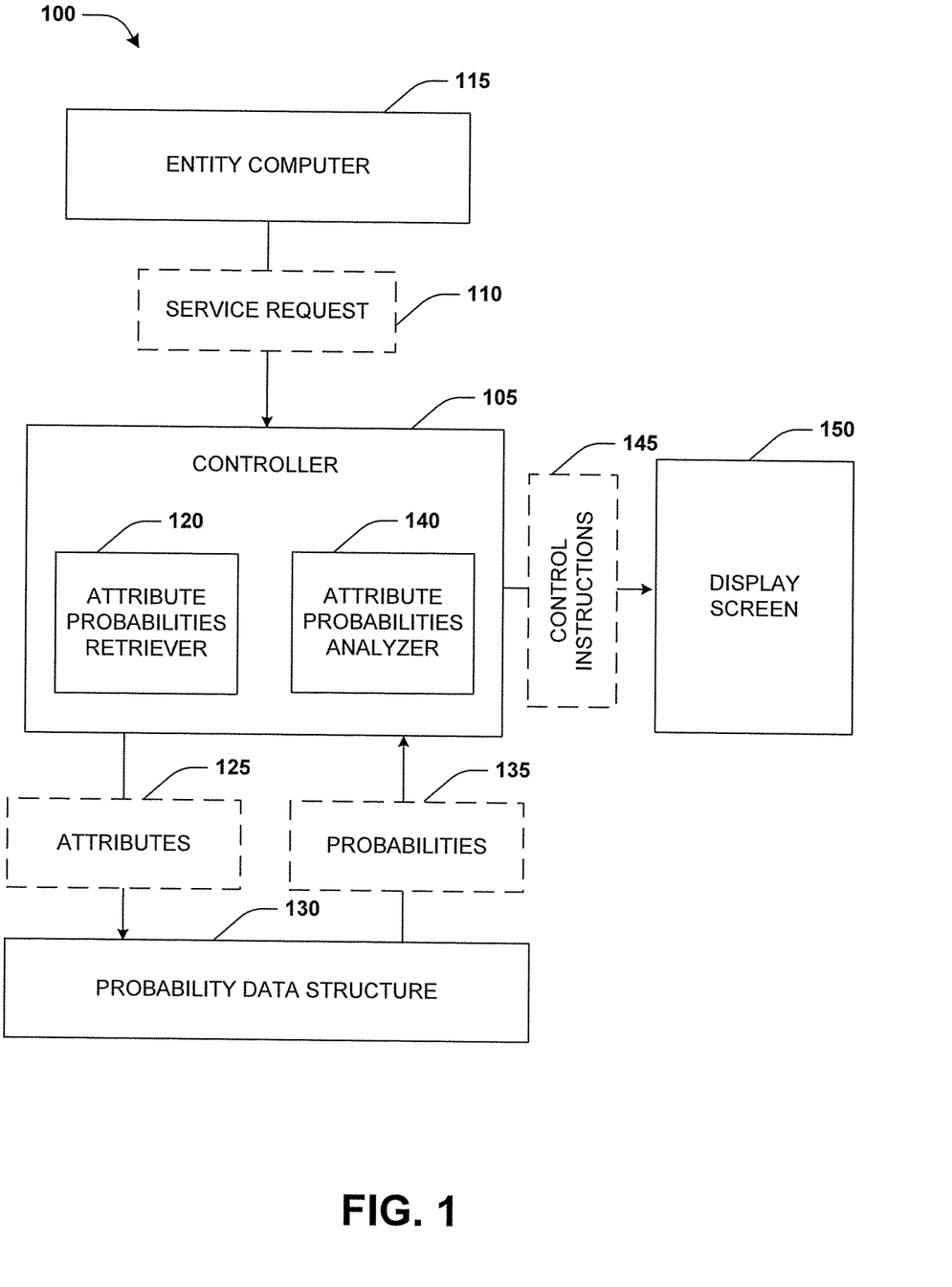
FIG. 1 illustrates an embodiment of a system associated with controlling a display screen with graphical objects in a computing system.

With reference to FIG. 1, one embodiment of a computerized system 100 associated with controlling a display screen based upon a prediction of whether a service request will comply with service criteria is illustrated. The system 100 includes a controller 105, which may be configured to execute on a computer. The controller 105 may be initiated based upon a service request 110 being received from an entity computer 115, such as a computer of a manager or customer of an online service that is requesting a service request to be generated or processed. For example, the online service may be an electronic device repair and troubleshooting service and the service request may be a request for assistance with a type of smartphone. The controller 105 may receive the service request 110 over a network connection.

The controller 105 utilizes the attribute probabilities retriever 120 to generate attributes 125 of the service request 110 that influence the processing and state transitions of the service request 110. The attributes 125 may specify a product or service type of the service request 110, such as the type of smartphone, or a team (of the online service) that is assigned to handle the service request 110, such as a (higher performing) first tier team rather than a (lower performing) second tier team.

The attributes 125 are used to analyze a probability data structure 130 in order to identify data records to be considered for the service request 110. The probability data structure 130 includes data records of probabilities that represent transitions between states of a plurality of historical service requests.

The probability data structure 130 may have been generated prior to receiving the service request 110. In some examples, a training data set may be created for each attribute of a plurality of attributes based upon a historical data structure. For example, historical data for a period of time (e.g., 6 months, 1 year, etc.) for one attribute (or a combination of attributes) may be used (aggregated/grouped) to create a first training data set, while historical data for the period of time for another attribute (or another combination of attributes) may be used (aggregated/grouped) to create a second training data set.

State transition probabilities may be calculated for each attribute (or a combination of attributes) based upon the corresponding training data set. For example, the first training data set may be used to calculate first state transition probabilities, and the second training data set may be used to calculate second state transition probabilities. The state transition probabilities for each attribute may be stored or updated in the probability data structure 130. For example, the first state transition probabilities and the second state transition probabilities may be stored in the probability data structure 130 in association with their corresponding attribute.

The data records of each of the historical service requests are associated with at least one attribute. For example, the data records of a first set of historical service requests may include a first identifier indicative of a first product that the first set of historical service requests pertained to and a second identifier indicative of a first team that processed the first set of historical service requests, while the data records of a second set of historical service requests may include a third identifier indicative of a second product that the second set of historical service requests pertained to and a fourth identifier indicative of a second team that processed the second set of historical service requests.

The data records of each of the sets of historical service requests are associated with at least one probability representative of a state transition. For example, data records of the first set of historical service requests may include a first probability representing a likelihood of each historical service request in the first set transitioning from a first state to a second state in compliance with service criteria corresponding to the first set of historical service requests, while data records of the second set of historical service requests may include a second probability representing a likelihood of each historical service request in the second set transitioning from the first state to the second state in compliance with service criteria corresponding to the second set of historical service requests.

The controller 105 uses the probability data structure 130 to generate probabilities 135 for the historical service requests that match the attributes 125. For example, a first attribute, such as the type of smartphone that the service request 110 is for, and a second attribute, such as the team that is handling the service request 110, may be used to search the probability data structure 130.

A first set of probabilities that match the first attribute, such as probabilities representing likelihoods of state transitions in compliance with service criteria for service requests for the type of smartphone, may be identified. A second set of probabilities that match the second attribute, such as probabilities representing likelihoods of state transitions in compliance with service criteria for service requests for the team, may be identified. A third set of probabilities that match the first attribute and the second attribute, such as probabilities representing likelihoods of state transitions in compliance with service criteria for service requests that are both for the type of smartphone and for the team, may be identified.

Data records for the first set of probabilities, the second set of probabilities and/or the third set of probabilities may be included in the probabilities 135. Data records for one or more sets of probabilities that represent historical service requests that pertain to different products or different teams may not be included in the probabilities 135.

In some examples, the probabilities in the probability data structure 130 may be stored in stochastic matrices. For example, the first set of probabilities may be stored in a first matrix, the second set of probabilities may be stored in a second matrix, or the third set of probabilities may be stored in a third matrix.

In some examples, the probability data structure 130 does not (initially) include data records for sets of probabilities that match one or more attributes of the service request 110, such as the first attribute or the second attribute. Estimated sets of probabilities are generated based upon probabilities corresponding to similar attributes or randomly, are stored in the probability data structure, and are included in the probabilities 135. The estimated sets of probabilities are modified/improved (over time) based upon data gathered about the state transitions the service request 110 or other service requests matching the attributes of the service request 110.

In some examples, the controller 105 may determine which service level agreement (SLA) applies to the service request from amongst a plurality of SLAs. For example, the SLA may be specified in the service request, or the SLA may be determined based upon one or more characteristics of the service request. The characteristics may include a company that initiated the service request, a geographical location of the service request, a size of an entity (e.g., consumer, corporate, etc.) associated with the service request, and/or one or more of the attributes of the service request.

The controller 105 may analyze the SLA to identify the service criteria for processing the service request. For example, a determination may be made that the SLA has a first criterion for transitioning from a first state to a second state, a second criterion for transitioning from the second state to a third state, and a third criterion for transitioning from the third state to a fourth state.

The controller 105 utilizes the attribute probabilities analyzer 140 to analyze the probabilities 135 for the calculation of a probability that the service request will transition to a target state (the second state, the third state, or the fourth state) in compliance with the corresponding service criteria. For example, the third set of probabilities (represented by the third matrix) may be used in combination with the corresponding service criteria to calculate a likelihood of the service request transitioning to the target state while complying with the corresponding service criteria.

Based upon the calculated probability, the controller 105 predicts whether the service request will transition to the target state in compliance with the service criteria. The prediction is made based upon whether the probability exceeds a threshold. For example, if the calculation indicates that the service request is at least 51% likely to transition to the target state within the requirements of the service criteria, the service request may be predicted to transition to the target state in compliance with the service criteria. If, instead, the calculation indicates that the service request is less than 51% likely to transition to the target state within the requirements of the service criteria, the service request may be predicted to not transition to the target state in compliance with the service criteria.

The controller 105 generates control instructions 145 to provide to, and thus control, the display screen 150. The control instructions 145 may provide for the display screen 150 to display graphical objects corresponding to the prediction. For example, the control instructions 145 may provide for the display screen 150 to change a graphical representation of the service request 110 to visually distinguish the graphical representation of the service request 110 from graphical representations of other service requests and indicate a likeliness of the service request 110 complying with the service criteria. The controlling of the display screen 150 increases the speed at which the service request 110 is identified by reducing or eliminating time needed to search and navigate through various menus and displays, and thus improves the speed and usability of computer displays.

In some examples, the display screen 150 may highlight a first graphical object corresponding to the service request responsive to determining that the service request is predicted to not comply with the service criteria, but may not highlight one or more graphical objects corresponding to other service requests responsive to determining that the other service request are predicted to comply with the service criteria. In some examples, the display screen 150 may order the service requests and thus display the service request above the other service requests, or display additional information about the service request while not displaying the additional information about the other service requests.

In some examples, the graphical representation of the service request may be distinguished from the graphical representations of the other service requests based upon a comparison of the probability to a threshold probability. The threshold probability may be the same as or different than the threshold used to perform the prediction.

For example, even when the service request is predicted to fail to comply with the service request due to not meeting the threshold used to perform the prediction (e.g., 51%), the service request may not be graphically distinguished from the other service requests if the probability of the service request complying does not fall below the threshold probability (e.g., 40%) while the probabilities for the other service requests do fall below that threshold probability. In another example, even when the service request is predicted to comply with the service request due to meeting the threshold used to perform the prediction (e.g., 51%), the service request may be graphically distinguished from the other service requests if the probability of the service request complying does fall below the threshold probability (e.g., 60%) while the probabilities for the other service requests do not fall below that threshold probability.

In some examples, the probability may be used to determine whether to perform corrective actions associated with the service request. For example, when the probability is determined to meet a threshold probability, a corrective action data structure may be searched for corrective actions. Corrective actions can include diversion of computer resources from a first task (corresponding to a different service request) to a second task (corresponding to the service request), diversion of human resources from the first task (corresponding to a different service request) to the second task (corresponding to the service request), postponement of one or more other service requests, prioritizing of one or more service requests, etc. Corrective actions that match the probability and the attributes of the service request may be identified in the corrective action data structure. Instructions to perform the identified corrective actions are generated and transmitted, via a communication network, to one or more devices of the online service.

Figure 2:
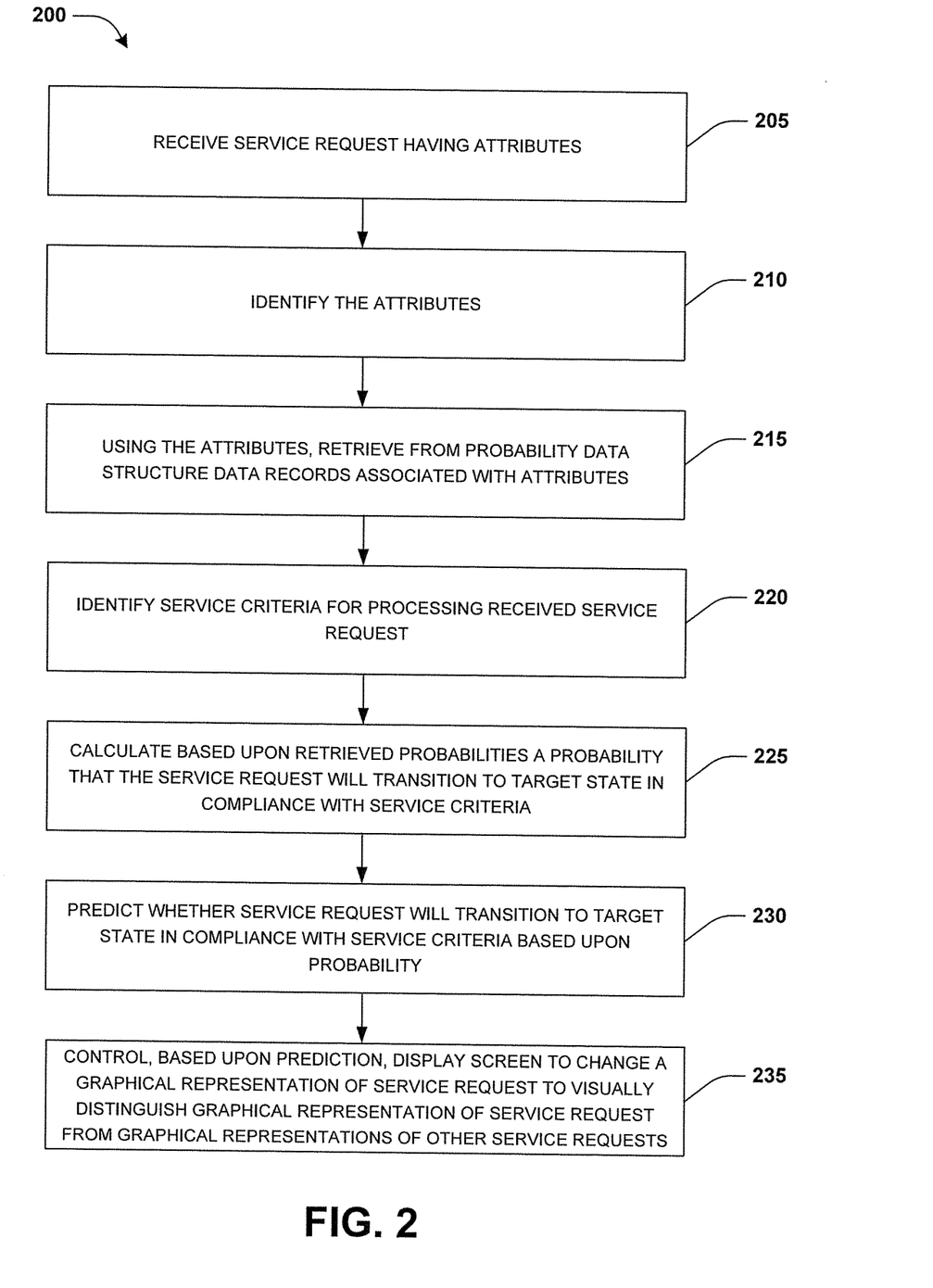
FIG. 2 illustrates an embodiment of a method associated with controlling the display screen with graphical objects in the computing system.

FIG. 2 illustrates one embodiment of a computer-implemented method 200 associated with controlling a display screen based upon a prediction of whether a service request will comply with service criteria. In one embodiment, method 200 is performed by the controller 105 utilizing various computing resources of the computer 805 (shown in FIG. 8), such as the processor 810 for executing instructions, memory 815 and/or disks 830 for storing data structures within which control instructions are generated, and/or network hardware for transmitting data structures to remote computers over networks. The method 200 may be triggered based upon various triggers, such as receipt of the service request 110 from the entity computer 115, etc.

At 205, the service request 110 (provide a web hosting service) having one or more attributes is received. In some examples, the service request 110 is received by a server (hosting the controller 105), from the entity computer 115. At 210, in response to receiving the service request 110, the one or more attributes 125 (streaming video service, and a first web support team) of the service request are identified.

Figure 4:
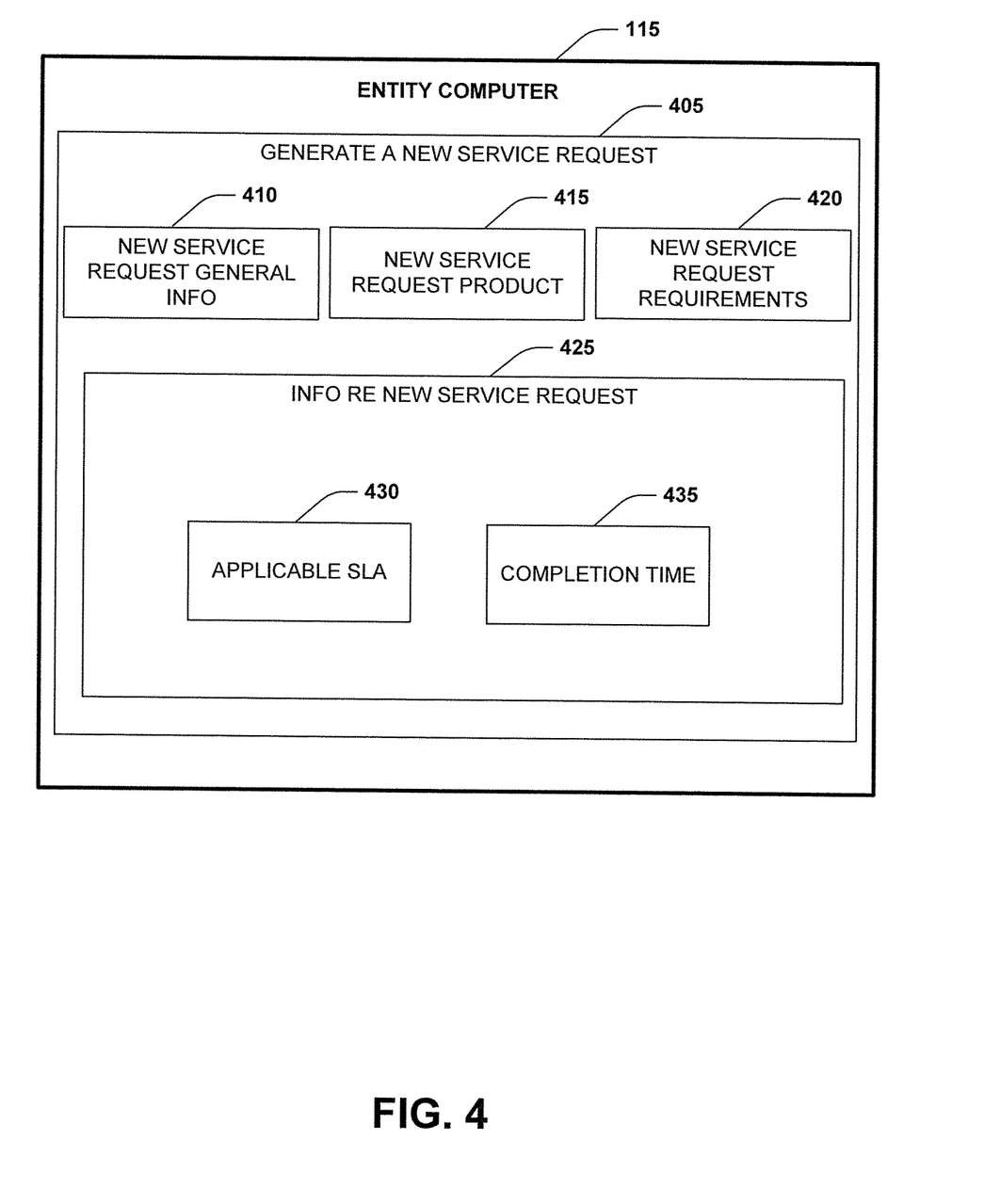
FIG. 4 illustrates an embodiment of an entity computer and a graphical user interface.

FIG. 4 illustrates one embodiment of a graphical user interface 405 on the entity computer 115 that may be used to generate the service request 110. The graphical user interface 405 is controlled to display a first graphical object 410 configured to receive user input that selects general information, such as a location/target (website), of the service request 110, a second graphical object 415 configured to receive user input that selects a product (streaming video service) that the service request 110 pertains to, and a third graphical object 420 configured to receive user input that selects requirements (support for multiple video quality levels) of the service request 110.

The graphical user interface 405 is further controlled, based upon the user input received for the first graphical object 410, the second graphical object 415, and the third graphical object 420, to display a fourth graphical object 425 configured to display a fifth graphical object 430 and a sixth graphical object 435. The fifth graphical object 430 is configured to display one or more SLAs that are applicable to the service request 110. In some examples, fifth graphical object 430 is configured to receive user input that selects at least one SLA from amongst a plurality of SLAs. The sixth graphical object 435 is configured to display an expected time of completion for the service request 110.

Figure 3A:
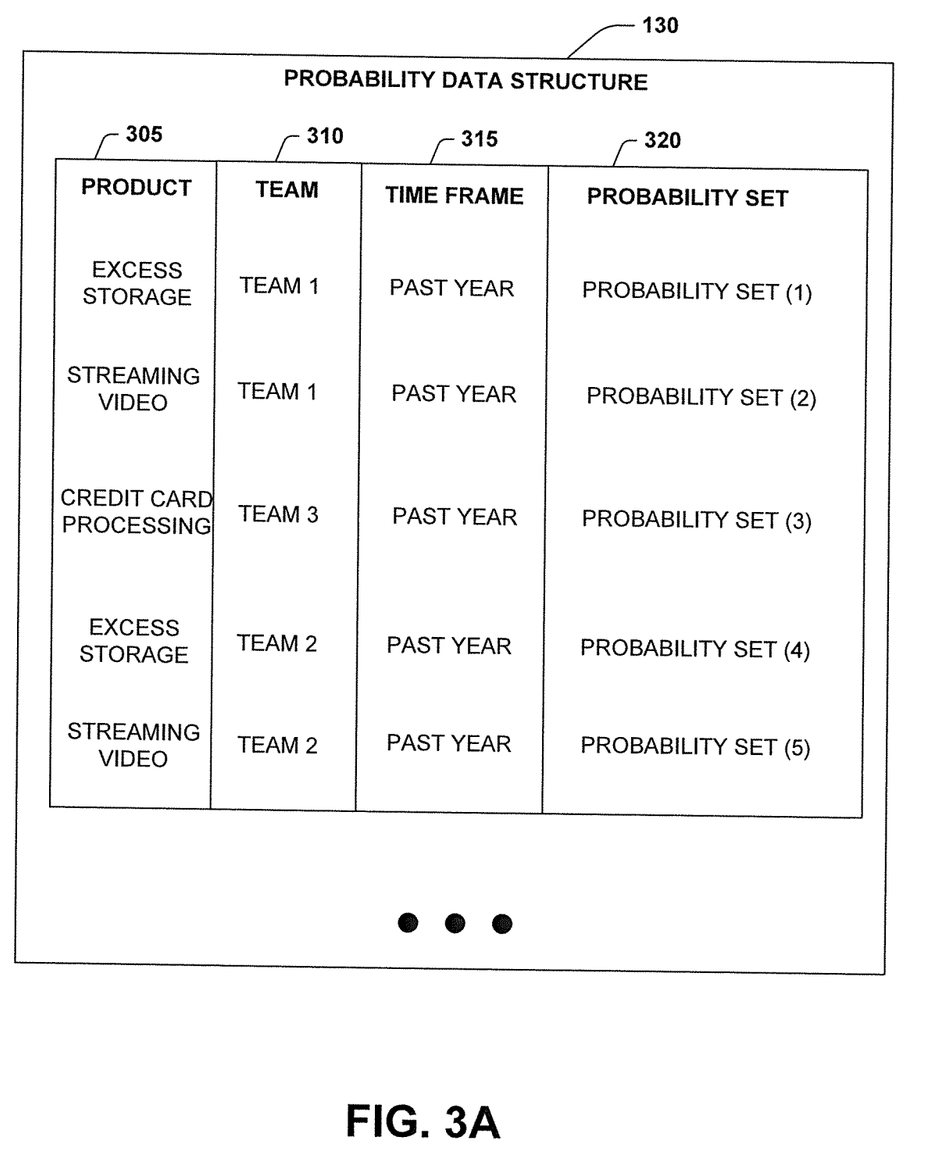
FIG. 3A illustrates an embodiment of a probability data structure.

Returning to FIG. 2, at 215, using the one or more identified attributes, data records associated with the one or more attributes 125 are retrieved from the probability data structure 130. In some examples, the data records represent transitions between states of historical service requests, and are retrieved via a network communication. One embodiment of the probability data structure 130 is illustrated in FIG. 3A and includes indications of a plurality of products 305, a plurality of teams 310, time frames 315 that the respective probabilities reflect, and probability sets 320 associated with one or more of the plurality of products 305.

Figure 3B:
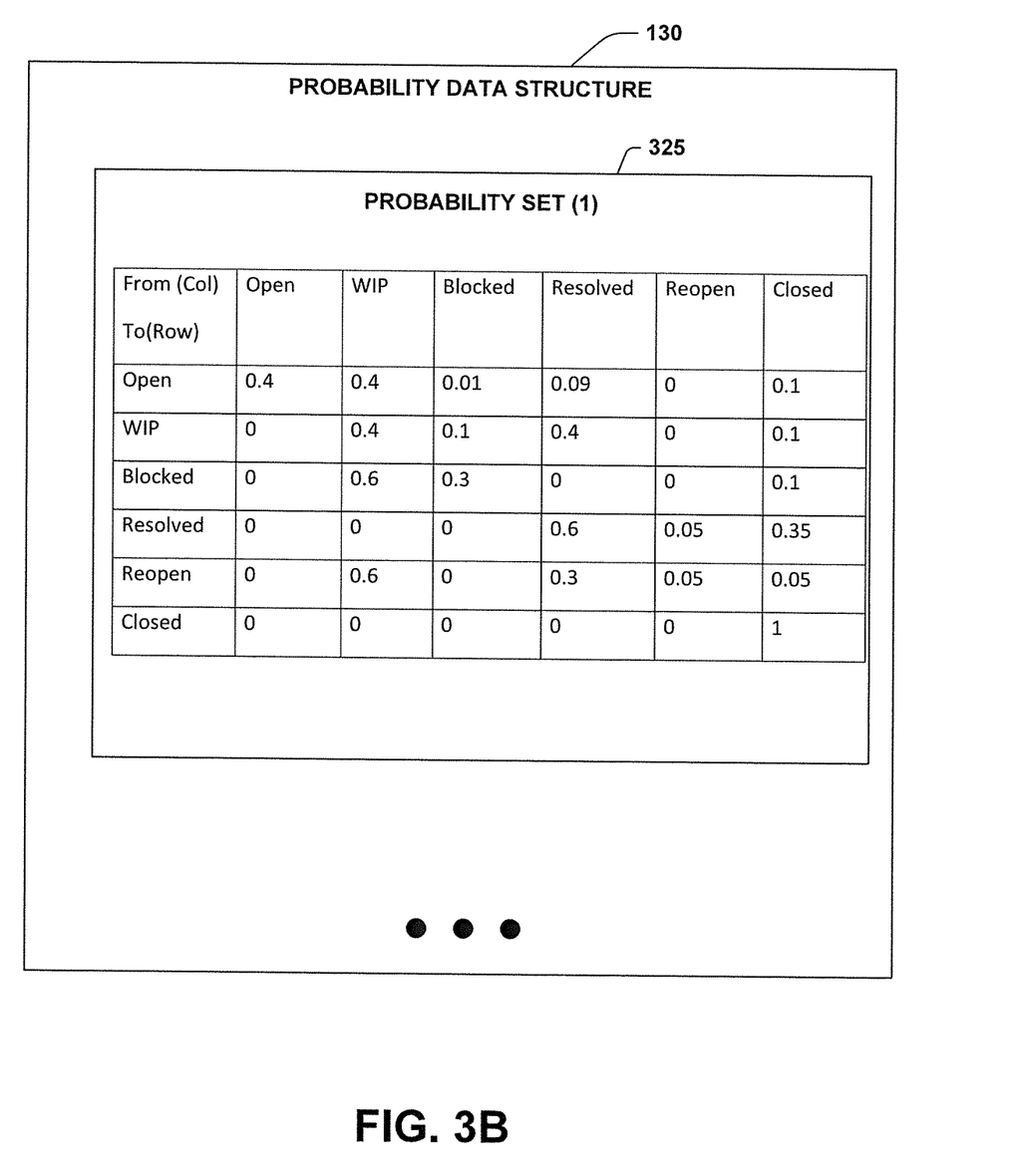
FIG. 3B illustrates another embodiment of the probability data structure.

FIG. 3B illustrates an embodiment of a first probability set 325 stored in the probability data structure 130. The first probability set 325 for a first product (streaming video) being handled by a first team (first web support team 1) includes the probabilities of one or more transitions between defined states (open, work in progress, blocked, resolved, reopened, closed). In some examples, the first probability set 325 is stored as a square stochastic matrix of a Markov chain. Data records of probabilities 135 in the probability data structure 130 that correspond to the attributes 125 may be retrieved (downloaded), while other data records that do not correspond to the attributes 125 may not be retrieved.

The data records of the probabilities 135 that are retrieved include the first probability set 325, which is representative of transitions between states for historical service requests for the first product (streaming video) handled by the first team (team 1). That is, since the attributes associated with the first probability set 325 matches the attributes 125 of the service request 110, the first probability set 325 is among the data records of the probabilities 135 that are retrieved.

Returning to FIG. 2, at 220, service criteria (5 day deadline) for processing the service request 110 are identified. The service criteria include one or more requirements that the server is contractually bound to meet. In some examples, the service criteria may be identified by determining which SLA (for corporate customers) governs the processing of the service request 110, and analyzing the SLA to determine the service criteria.

At 225, a probability that the service request 110 will transition to a target state (completion) in compliance with the service criteria (5 day deadline) is calculated based upon the data records of the probabilities 135 retrieved from the probability data structure 130. In some examples, the matrix of the first probability set 325 in the data records of the probabilities 135 is used in combination with the service criteria to calculate the probability of the service request 110 transitioning from a present state to the target state.

A quantity (5) of a unit of time is derived from the service criteria (5 day deadline), and the matrix is multiplied by itself repeatedly for a number of times corresponding to the quantity (5). Stated differently, the matrix is raised to the power of the quantity (5). For example, the matrix raised to the first power represents the states at the end of day 1, the matrix raised to the second power represents the states at the end of day 2, and the matrix raised to the fifth power represents the states at the end of day 5. In some examples, the matrix multiplied by a current state matrix, which includes a probability of a current state, represents the states for a next unit of time.

At 230, a prediction is made as to whether the service request will transition to the target state in compliance with the service criteria based upon the calculated probability. For example, the calculated probability may be compared to a threshold probability (0.9). When the calculated probability exceeds the threshold probability, the service request may be predicted to transition to the target state in compliance with the service criteria. When the calculated probability does not meet the threshold probability, the service criteria may be predicted to be likely to fail to transition to the target state in compliance with the service criteria.

Figure 5:
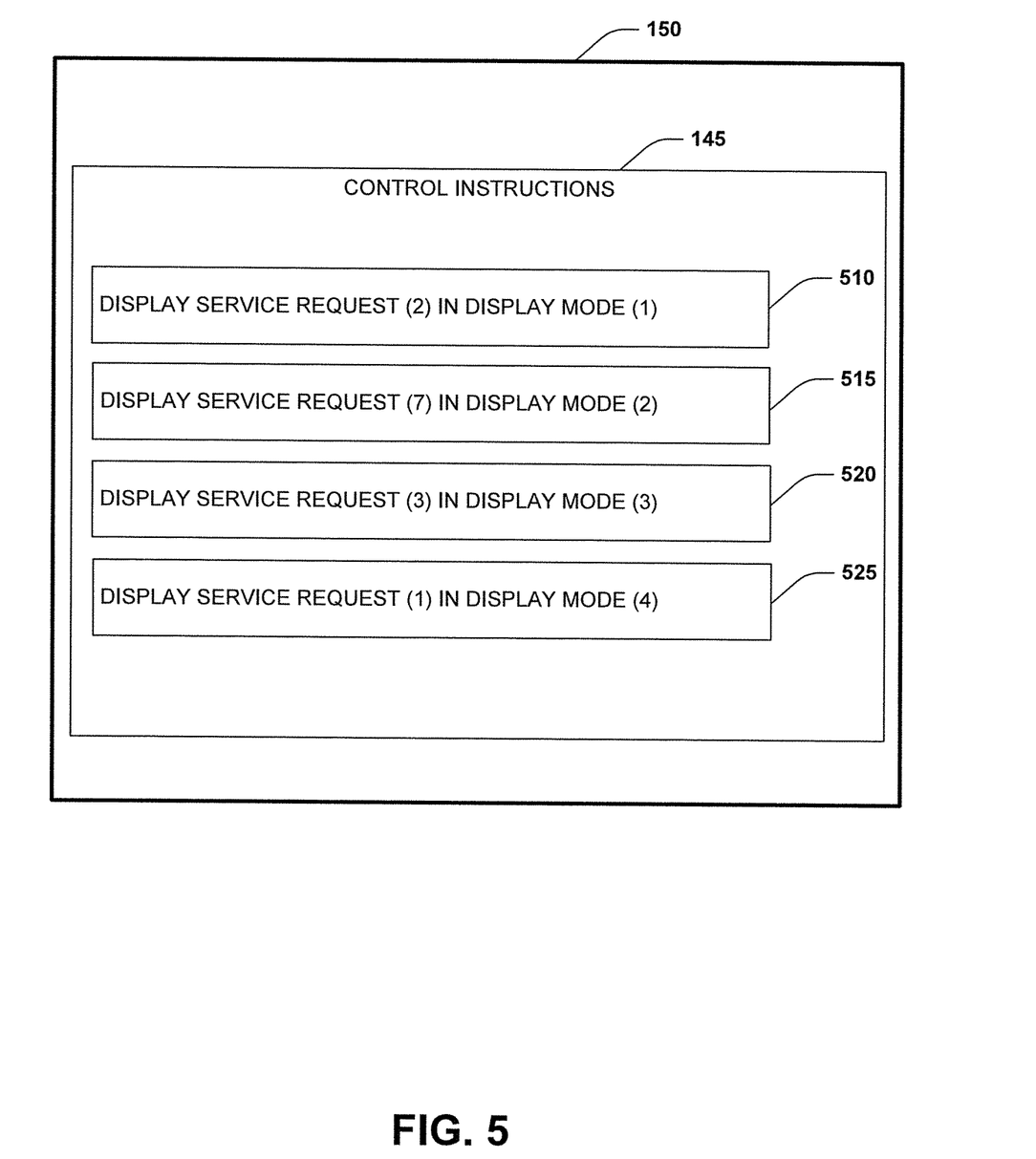
FIG. 5 illustrates an embodiment of the display screen with control instructions.

Based upon the prediction, control instructions 145 for controlling the display screen 150 are generated. One embodiment of the control instructions 145 is illustrated in FIG. 5 and includes a first instruction 510 to display the service request 110 in a first display mode (highlighted), a second instruction 515 to display a second service request in a second display mode, a third instruction 520 to display a third service request in a third display mode and a fourth instruction 525 to display a fourth service request in a fourth display mode.

In some examples, the different display modes can correspond to different manners of displaying information about each service request (in a rank/order, bold, highlighted, etc.), while in other examples, the different display modes can correspond to displaying different levels of information and graphical objects configured to receive user input for each service request. In some examples, one or more service requests can be highlighted while other service requests are not highlighted. In other examples, one, some or all of the service requests may be ranked/ordered based upon their respective predictions of compliance with their corresponding service criteria.

At 235, the display screen 150 is controlled based upon the control instructions 145 to change a graphical representation of the service request 110 to visually distinguish the graphical representation of the service request 110 from graphical representations of other service requests. For example, the graphical representation of the service request may be highlighted with one or more visual effects that are not applied to the other service requests.

Figure 6:
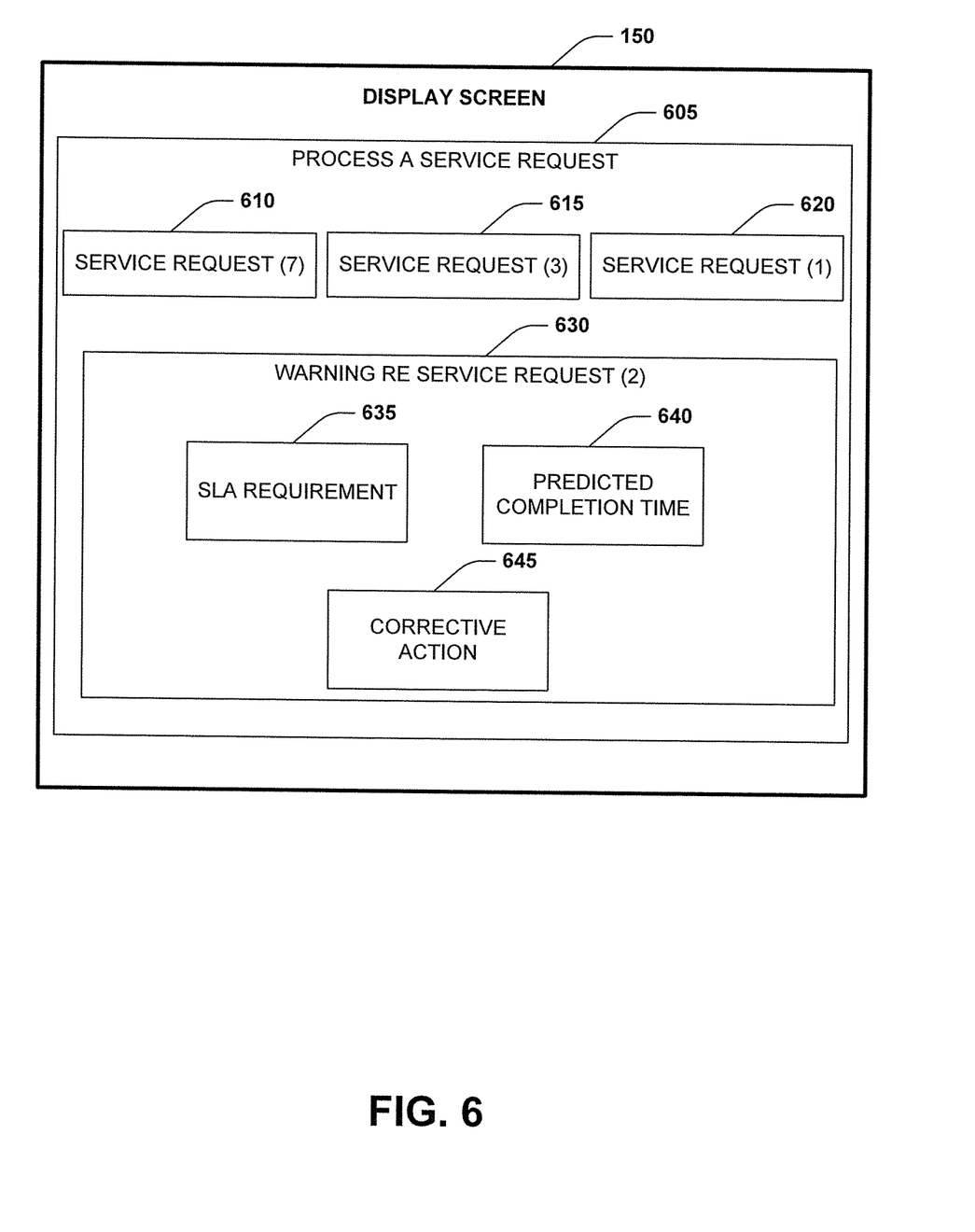
FIG. 6 illustrates another embodiment of the display screen and a graphical user interface.

One embodiment of the controlling of the display screen 150 is illustrated in FIG. 6. The display screen 150 renders a processing graphical user interface 605, which includes a graphical object 610 graphically representing a second service request, a graphical object 615 graphically representing a third service request, and a graphical object 620 graphically representing a fourth service request. The service request 110 is graphically represented in the processing graphical user interface 605 by graphical object 630, configured to display a warning regarding the service request 110. The graphical object 630 includes a graphical object 635 configured to display the requirements of the applicable SLA (5 day deadline), a graphical object 640 configured to display when the target state is expected to be met (after 5 day deadline), and a graphical object 645 configured to receive user input that causes the performance of one or more corrective actions, such as reassigning resources to the service request 110 (or the team processing the service request 110). The controlling of the display screen 150 increases the speed at which the service request 110 is identified, and thus improves the speed and usability of computer displays.

In some examples, the probability data structure 130 is generated and continually updated. For example, historical service request data records are scanned to identify the attributes of the respective historical service request data records, and the historical service request data records are grouped based upon the attributes. One or more probability sets are generated for the attributes. Each probability set corresponds to one attribute (product) or a combination of two or more attributes (product and team). Each probability set includes a matrix including one or more state transition probabilities.

A state transition probability representative of a transition from a first state to a second state can be calculated by dividing a first number of service requests that transition from the first state to the second state by a second total number of service requests in the first state. This calculation can be repeated to determine the desired state transition probabilities and populate the matrix. It may be appreciated that the sum of probabilities from a given state to all other possible states should add up to 1.

In some examples, the calculated state transition probabilities are stored in a table wherein each state transition probability is identified with its corresponding attribute (or combination of attributes), an initial state, and a destination state. For example, returning to the first probability set 325 illustrated in FIG. 3B, the table may include a first row indicating that for the combination of the attributes used to generate the first probability set 325 (streaming video and team 1), the probability of transitioning from an open state to an open state is 0.4, a second row indicating that for the combination of the attributes, the probability of transitioning from an open state to a work in progress (WIP) state is 0.4, and a third row indicating that for the combination of the attributes, the probability of transitioning from an open state to a blocked state is 0.01.

In some examples, each row of the table may identify a type of the object (service request, or activities) that the state transition probability was calculated for and an identifier of that object (service request #245), in addition to or instead of identifying the corresponding attributes.

The table can be stored in the probability data structure 130, or in another data structure (on the same server as the probability data structure 130, or on a different server). In some embodiments, when another request for a prediction (for the same service request, or similar service request) is received within a threshold period of time (e.g., before the data records are updated), the probabilities 135 used to calculate a probability and predict whether a service request is likely to comply with service criteria are retrieved from the table (rather than the probability data structure 130). Use of the table increases the speed and reduces the processing required to identify probabilities needed to determine whether the service request or other service requests are likely to violate their applicable SLAs.

At regular intervals, or in response to a request, the historical service request data records are rescanned and regrouped to account for recently processed service requests, and the probability sets affected by the recently processed service requests are updated accordingly.

In some examples, the system is self-learning and progressively improves in accuracy (over time) by refining its records (including those stored in the probability data structure 130, the table, or elsewhere) based upon newly received service requests and the corresponding calculations that are performed in association with the newly received service requests. Such records include probabilities, calculations, predictions, states, etc.

In some examples, the method and system disclosed herein is used to process objects other than service requests. The objects may include an object that has two or more possible states, and can transition from one state to another. Some examples of objects include business objects or activities.

Figure 7:
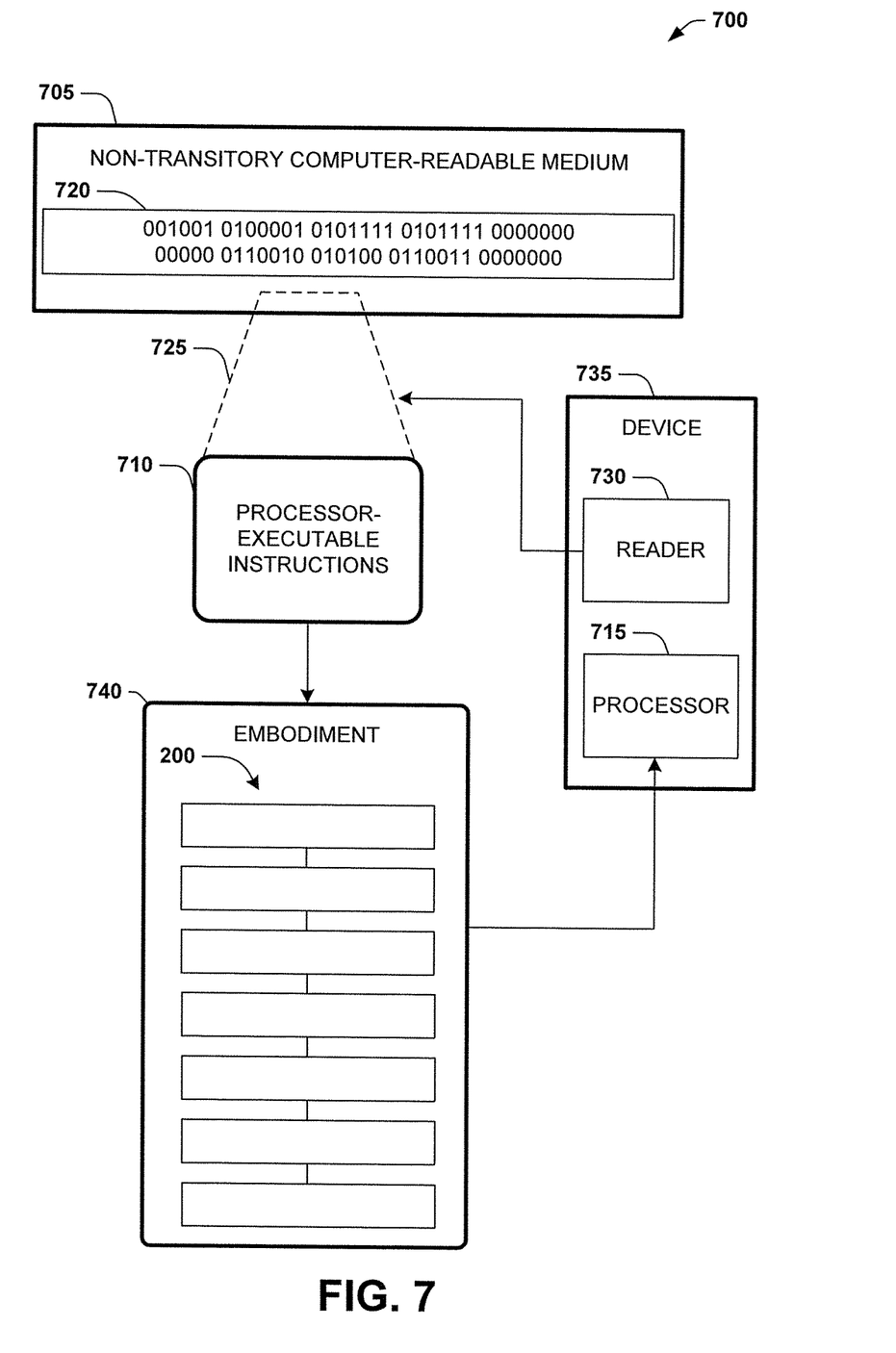
FIG. 7 illustrates an embodiment of a non-transitory computer-readable medium.

FIG. 7 is an illustration of a scenario 700 involving an example non-transitory computer-readable medium 705. In one embodiment, one or more of the components described herein are configured as program modules, such as the controller 105, stored in the non-transitory computer-readable medium 705. The program modules are configured with stored instructions, such as processor-executable instructions 710, that when executed by at least a processor, such as processor 715, cause the computing device to perform the corresponding function(s) as described herein. For example, functionality of the controller 105, stored in the non-transitory computer-readable medium 705, may be executed by the processor 715 as the processor-executable instructions 710 to perform an embodiment 740 of the method 200 of FIG. 2.

The non-transitory machine readable medium 705 includes the processor-executable instructions 710 that when executed by a processor 715 cause performance of at least some of the provisions herein. The non-transitory machine readable medium 705 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the example method 200 of FIG. 2, for example. In some embodiments, the processor-executable instructions 710 are configured to cause implementation of a system, such as at least some of the example system 100 of FIG. 1, for example.

Figure 8:
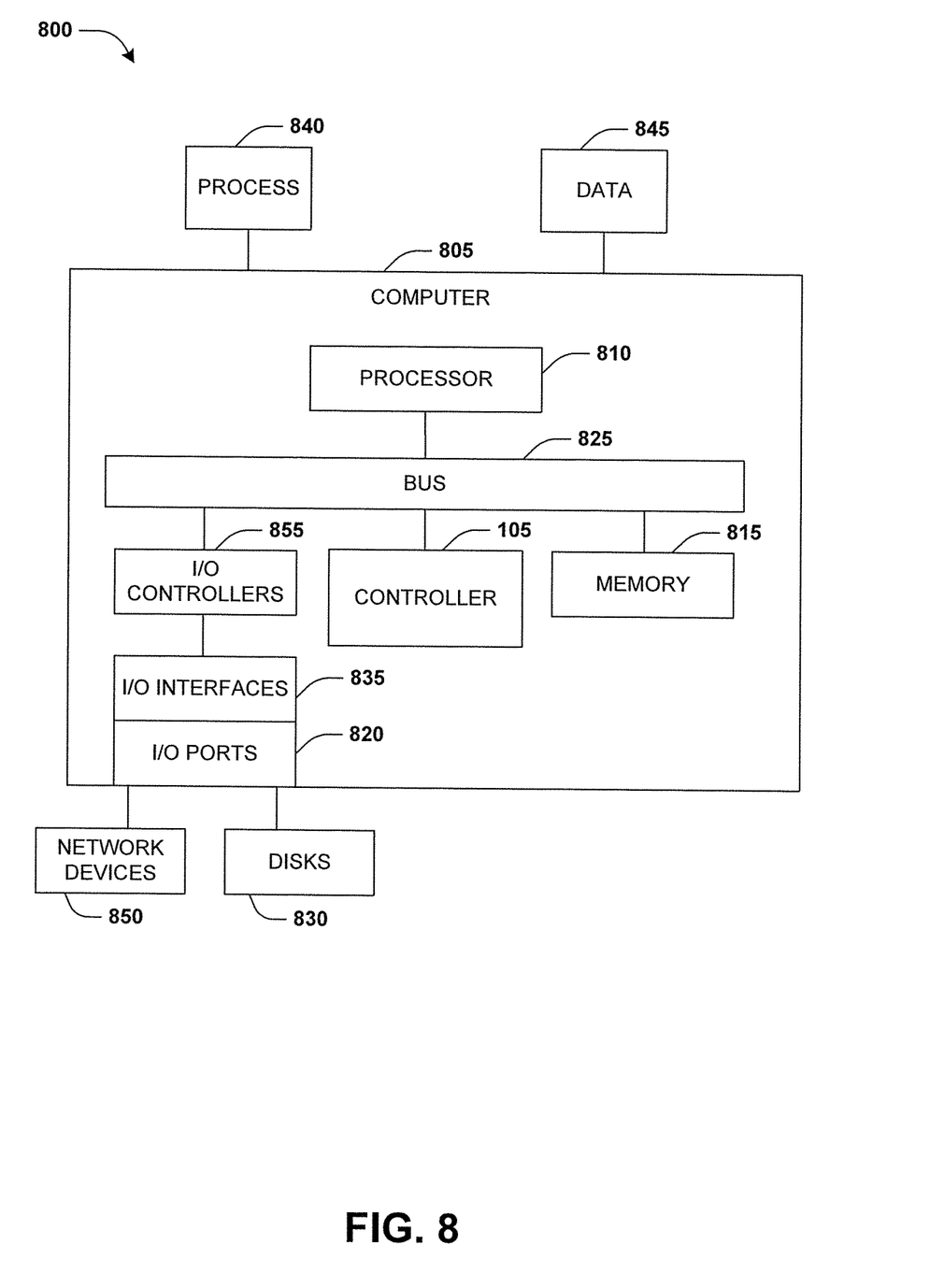
FIG. 8 illustrates an embodiment of a computing system configured with the example systems and/or methods disclosed.

FIG. 8 illustrates a scenario 800 of an example computing device that is configured and/or programmed with one or more of the example systems and methods described herein, and/or equivalents. The example computing device may be a computer 805 that includes a processor 810, a memory 815, and input/output ports 820 operably connected by a bus 825. In one example, the computer 805 may include logic of the controller 105 configured to facilitate the system 100 and/or the method 200 shown in FIGS. 1 and 2. In different examples, the logic of the controller 105 may be implemented in hardware, a non-transitory computer-readable medium 705 with stored instructions, firmware, and/or combinations thereof. While the logic of the controller 105 is illustrated as a hardware component attached to the bus 825, it is to be appreciated that in other embodiments, the logic of the controller 105 could be implemented in the processor 810, stored in memory 815, or stored in disk 830.

In one embodiment, logic of the controller 105 or the computer 805 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 805 as data 845 that are temporarily stored in memory 815 and then executed by processor 810.

The logic of the controller 105 may also provide means (e.g., hardware, non-transitory computer-readable medium 705 that stores executable instructions, firmware) for performing rule based source sequencing for allocation.

Generally describing an example configuration of the computer 805, the processor 810 may be a variety of various processors including dual microprocessor and other multiprocessor architectures. The memory 815 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 830 may be operably connected to the computer 805 via, for example, an input/output (I/O) interface (e.g., card, device) 835 and an input/output port 820. The disks 830 may be, for example, a magnetic disk drive, a solid state disk drive, a floppy disk drive, a tape drive, a Zip drive, a flash memory card, a memory stick, and so on. Furthermore, the disks 830 may be a CD-ROM drive, a CD-R drive, a CD-RW drive, a DVD ROM, and so on. The memory 815 can store a process 840 and/or a data 845, for example. The disk 830 and/or the memory 815 can store an operating system that controls and allocates resources of the computer 805.

The computer 805 may interact with input/output (I/O) devices via the I/O interfaces 835 and the input/output ports 820. Input/output devices may be, for example, a keyboard, a microphone, a pointing and selection device, cameras, video cards, displays, the disks 830, the network devices 850, and so on. The input/output ports 820 may include, for example, serial ports, parallel ports, and USB ports. I/O controllers 855 may connect the I/O interfaces 835 to the bus 825.

The computer 805 can operate in a network environment and thus may be connected to the network devices 850 via the I/O interfaces 835, and/or the I/O ports 820. Through the network devices 850, the computer 805 may interact with a network. Through the network, the computer 805 may be logically connected to remote computers. Networks with which the computer 805 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   in response to receiving, by at least the processor, a service request having one or more attributes, identify, by at least the processor, the one or more attributes of the service request;
   using the one or more attributes, retrieve from a probability data structure, by at least the processor, data records associated with the one or more attributes, wherein the data records include probabilities representing transitions between states of historical service requests;
   determine a service level agreement (SLA) associated with the service request from amongst a plurality of SLAs;
   analyze the SLA to determine and identify service criteria for processing the received service request;
   calculate based upon the retrieved probabilities, by at least the processor, a probability that the service request will transition to a target state in compliance with the service criteria;
   predict, by at least the processor, whether the service request will transition to the target state in compliance with the service criteria based upon the calculated probability;
   determine whether the calculated probability is below a threshold probability;
   responsive to determining that the calculated probability is below the threshold probability, search a corrective action data structure for corrective actions matching the calculated probability and the one or more attributes;
   responsive to identifying a first set of corrective actions, in the corrective action data structure, that matches the calculated probability and the one or more attributes, generate instructions to perform the first set of corrective actions;
   transmit to one or more devices, via a communication network, the instructions to perform the first set of corrective actions; and control, based upon the prediction, by at least the processor, a display screen to change a graphical representation of the service request to visually distinguish the graphical representation of the service request from graphical representations of other service requests and indicate a likeliness of the service request complying with the corresponding service criteria.

2. The non-transitory computer-readable medium of claim 1, wherein the computer-executable instructions to retrieve from the probability data structure data records associated with the one or more attributes further include computer-executable instructions that when executed by the processor cause the computer to:
  search the probability data structure for probabilities matching a first attribute and a second attribute included in the one or more attributes; and
  responsive to identifying (i) a first set of probabilities, in the probability data structure, that matches the first attribute and (ii) a second set of probabilities, in the probability data structure, that matches the second attribute, then retrieve data records including the first set of probabilities and the second set of probabilities, wherein the probability is calculated based upon the first set of probabilities and the second set of probabilities.

3. The non-transitory computer-readable medium of claim 1, further comprising instructions that when executed by the processor cause the computer to:
  determine that the service request is associated with a request for service for a product;
  search the probability data structure for data records that include probabilities derived from historical requests for service for the product; and
  calculate the probability using the probabilities in the probability data structure derived from historical requests for service for the product.

4. The non-transitory computer-readable medium of claim 1, further comprising instructions that when executed by at least the processor cause the computer to:
  determine whether the probability is below a threshold probability; and
  responsive to determining that the probability is below the threshold probability, perform the computer-executable instructions to control based upon the prediction the display screen to change the graphical representation of the service request.

5. The non-transitory computer-readable medium of claim 1, further comprising instructions that when executed by at least the processor cause the computer to:
  create a training data set for each attribute of a plurality of attributes based upon a historical data structure;
  calculate state transition probabilities for each attribute based upon the corresponding training data set; and
  store the state transition probabilities for each attribute in the probability data structure.

6. A computing system, comprising:
  a processor connected to memory; and
  a predicting module stored on a non-transitory computer readable medium and configured with instructions that when executed by the processor cause the processor to:
    in response to receiving a service request having one or more attributes, identify, by at least the processor, the one or more attributes of the service request;
    using the one or more attributes, retrieve from a probability data structure data records associated with the one or more attributes, wherein the data records include probabilities representing transitions between states of historical service requests;
    determine a service level agreement (SLA) associated with the service request from amongst a plurality of SLAs;
    analyze the SLA to determine and identify service criteria for processing the received service request;
    calculate based upon the retrieved probabilities a probability that the service request will transition to a target state in compliance with the service criteria;
    predict whether the service request will transition to the target state in compliance with the service criteria based upon the probability;
    determine whether the calculated probability is below a threshold probability;
    responsive to determining that the calculated probability is below the threshold probability, search a corrective action data structure for corrective actions matching the calculated probability and the one or more attributes;
    responsive to identifying a first set of corrective actions, in the corrective action data structure, that matches the calculated probability and the one or more attributes, generate instructions to perform the first set of corrective actions;
    transmit to one or more devices, via a communication network, the instructions to perform the first set of corrective actions; and
    control, based upon the prediction, a display screen to change a graphical representation of the service request to visually distinguish the graphical representation of the service request from graphical representations of other service requests and indicate a likeliness of the service request complying with the corresponding service criteria.

7. The computing system of claim 6, wherein the instructions to retrieve from the probability data structure data records associated with the one or more attributes further include instructions that when executed by the processor cause the processor to:
  search the probability data structure for probabilities matching a first attribute and a second attribute included in the one or more attributes; and
  responsive to identifying (i) a first set of probabilities, in the probability data structure, that matches the first attribute and (ii) a second set of probabilities, in the probability data structure, that matches the second attribute, then retrieve data records including the first set of probabilities and the second set of probabilities, wherein the probability is calculated based upon the first set of probabilities and the second set of probabilities.

8. The computing system of claim 6, wherein the predicting module is further configured with instructions that when executed by the processor cause the processor to:
  determine that the service request is associated with a request for service for a product;
  search the probability data structure for data records that include probabilities derived from historical requests for service for the product; and
  calculate the probability using the probabilities in the probability data structure derived from historical requests for service for the product.

9. The computing system of claim 6, wherein the predicting module is further configured with instructions that when executed by the processor cause the processor to:
  determine whether the probability is below a threshold probability; and
  responsive to determining that the probability is below the threshold probability, perform the computer-executable instructions to control based upon the prediction the display screen to change the graphical representation of the service request.

10. The computing system of claim 6, wherein the predicting module is further configured with instructions that when executed by the processor cause the processor to:
create a training data set for each attribute of a plurality of attributes based upon a historical data structure;
calculate state transition probabilities for each attribute based upon the corresponding training data set; and
store the state transition probabilities for each attribute in the probability data structure.

11. A computer-implemented method performed by a computing device comprising a processor, the computer-implemented method comprising:
in response to receiving, by at least the processor, a service request having one or more attributes, identifying, by at least the processor, the one or more attributes of the service request;
using the one or more attributes, retrieving from a probability data structure, by at least the processor, data records associated with the one or more attributes, wherein the data records include probabilities representing transitions between states of historical service requests;
determining a service level agreement (SLA) associated with the service request from amongst a plurality of SLAs;
analyzing the SLA to determine and identify service criteria for processing the received service request;
calculating based upon the retrieved probabilities, by at least the processor, a probability that the service request will transition to a target state in compliance with the service criteria;
predicting, by at least the processor, whether the service request will transition to the target state in compliance with the service criteria based upon the probability;
determining whether the calculated probability is below a threshold probability;
responsive to determining that the calculated probability is below the threshold probability, searching a corrective action data structure for corrective actions matching the calculated probability and the one or more attributes;
responsive to identifying a first set of corrective actions, in the corrective action data structure, that matches the calculated probability and the one or more attributes, generating instructions to perform the first set of corrective actions;
transmitting to one or more devices, via a communication network, the instructions to perform the first set of corrective actions; and
controlling, based upon the prediction, by at least the processor, a display screen to change a graphical representation of the service request to visually distinguish the graphical representation of the service request from graphical representations of other service requests and indicate a likeliness of the service request complying with the corresponding service criteria.

12. The computer-implemented method of claim 11, further comprising:
determining that the service request is associated with a request for service for a product;
searching the probability data structure for data records that include probabilities derived from historical requests for service for the product; and
calculating the probability using the probabilities in the probability data structure derived from historical requests for service for the product.

13. The computer-implemented method of claim 11, further comprising:
determining whether the probability is below a threshold probability; and
responsive to determining that the probability is below the threshold probability, performing the controlling based upon the prediction the display screen to change the graphical representation of the service request.

14. The computer-implemented method of claim 11, further comprising:
creating a training data set for each attribute of a plurality of attributes based upon a historical data structure;
calculating state transition probabilities for each attribute based upon the corresponding training data set; and
storing the state transition probabilities for each attribute in the probability data structure.

\* \* \* \* \*